(12) United States Patent
Riley

(10) Patent No.: US 6,750,463 B1
(45) Date of Patent: Jun. 15, 2004

(54) OPTICAL ISOLATION APPARATUS AND METHOD

(75) Inventor: Carl William Riley, Milan, IN (US)

(73) Assignee: Hill-Rom Services, Inc., Wilmington, DE (US)

(*) Notice: Subject to any disclaimer, the term of this patent is extended or adjusted under 35 U.S.C. 154(b) by 0 days.

(21) Appl. No.: 09/515,266

(22) Filed: Feb. 29, 2000

(51) Int. Cl.[7] .............................................. G02B 27/00
(52) U.S. Cl. ................................. 250/551; 250/227.14
(58) Field of Search ........................... 250/221, 227.14, 250/227.24, 551; 340/555, 556, 557; 385/12, 13, 24; 359/152, 154, 188

(56) References Cited

U.S. PATENT DOCUMENTS

| | | | |
|---|---|---|---|
| 4,075,034 A | 2/1978 | Butler | 136/246 |
| 4,325,137 A | 4/1982 | Yoshikazu | 359/171 |
| 4,433,199 A | 2/1984 | Middy | 136/246 |
| 4,692,683 A | 9/1987 | Lalmond | 322/2 R |
| 4,728,878 A | 3/1988 | Anthony | 322/2 R |
| 5,206,894 A | * 4/1993 | Makrinos et al. | 378/93 |
| 5,237,233 A | 8/1993 | Conley | 310/303 |
| 5,501,743 A | 3/1996 | Cherney | 136/248 |
| 5,560,700 A | 10/1996 | Levens | 362/558 |
| 5,575,860 A | 11/1996 | Cherney | 136/245 |
| 5,664,035 A | * 9/1997 | Tsuji et al. | 385/24 |
| 5,771,114 A | 6/1998 | Andersson et al. | 359/171 |
| 5,796,890 A | * 8/1998 | Tsuji et al. | 385/24 |

* cited by examiner

Primary Examiner—Edward J. Glick
Assistant Examiner—Courtney Thomas
(74) Attorney, Agent, or Firm—Bose McKinney & Evans LLP

(57) ABSTRACT

Optical isolation device (10) optically couples and electrically isolates various components on a local source circuit (36) from components on a remote isolated circuit (30). Light source (12) is coupled to opto-electrical detector (16) and opto-electrical sensor (20) is coupled to optical signal generator (18) by optical channel (14). The opto-electrical detector (16) is electrically coupled to remote isolated circuit (30) which is powered by the electricity generated by opto-electrical detector (16) in response to being impinged upon by light (22). Remote isolated circuit (30) is also electrically coupled to optical signal generator (18) which generates optical signals (32) in response to electrical signals received from remote isolated circuit (30). Opto-electrical sensor (20) produces electrical signals in response to being impinged upon by optical signals (32). Thus, remote isolated circuit (30) is completely electrically isolated from, but in communication with and powered by, local source circuit (36).

30 Claims, 7 Drawing Sheets

OPTICAL ISOLATION APPARATUS AND METHOD

FIELD OF THE INVENTION

This invention relates to isolation devices and more particularly to isolation devices which use an optical channel to isolate a remote circuit from a source circuit.

BACKGROUND OF THE INVENTION

In certain environments it is necessary to establish substantial electrical isolation between electrical control and power circuits. An example of such an environment is an electric hospital bed. Bed motion control circuits are often found in side rails, footboards, headboards, and in pendants connected via an umbilical cord to the motor power circuits. Metal and other conductive surfaces may be incidentally contacted by patients, caregivers, and even critical care equipment. When contact is made, a potential hazard exits if the conductive surface provides a path for current flow to earth ground. For this reason, regulatory bodies impose strict requirements on patient connected equipment and identify equipment in regard to its insulation abilities.

Having non-isolated electrical control circuitry in exposed areas such as side rails and footboards, presents a challenge to design engineers. It is known to provide power to a remote isolated circuit with an isolated power supply and send optically isolated control signals from the remote isolated circuit to the local source circuit which controls actuators powered by a non-isolated power supply. Signals generated by the remote isolated circuit are optically transmitted to the local source circuit and power to the remote isolated circuit is provided through bulk cables from the isolated power supply. However, isolated power supplies can be very costly.

SUMMARY OF THE INVENTION

The optical isolation device of the present invention transmits power from a power supply on a local source circuit optically along an optical channel to a remote isolated circuit. Signals generated by the remote isolated circuit are optically transmitted to a local source circuit which controls various actuators. Thus the remote isolated circuit is completely electrically isolated from the local source circuit.

An optical isolation device for transmitting power to and signals from an isolated electrical device in accordance with the present invention includes a light source for generating light, an optical channel having a first end on which the light impinges and a second end optically coupled to the first end, and an opto-electrical detector adjacent the second end producing electrical power to drive the isolated electrical device when impinged upon by the light. An optical signal generator generates optical signals in response to input provided by the isolated electrical device, the optical signals impinge upon the second end of the optical channel and are transmitted to an opto-electrical sensor adjacent the first end of the optical channel that generates electrical signals in response to the optical signals. The light and optical signals are both propagated through the optical channel.

Also in accordance with the invention is an opto-electric device including a first circuit having a first light source, a second circuit having a second light source, and a photovoltaic cell configured to provide energy to at least a portion of the second circuit. An optical channel couples the first and second circuits, and light from the first light source is transmitted to the photovoltaic cell over the optical channel, and light from the second light source is transmitted to the first circuit over the optical channel.

A method of the present invention for electrically isolating a remote circuit from a source circuit includes the steps of generating a first light signal in the source circuit, optically coupling the first light signal to the remote circuit so that the remote circuit receives the first light signal from the source circuit, generating power in the remote circuit from the first light signal received by the remote circuit, and powering the remote circuit by the generated power.

Additional features and advantages of the present invention will become apparent to those skilled in the art upon consideration of the following detailed description of illustrated embodiments exemplifying the best mode of carrying out the invention as presently perceived.

DETAILED DESCRIPTION OF THE DRAWINGS

Figure 1:
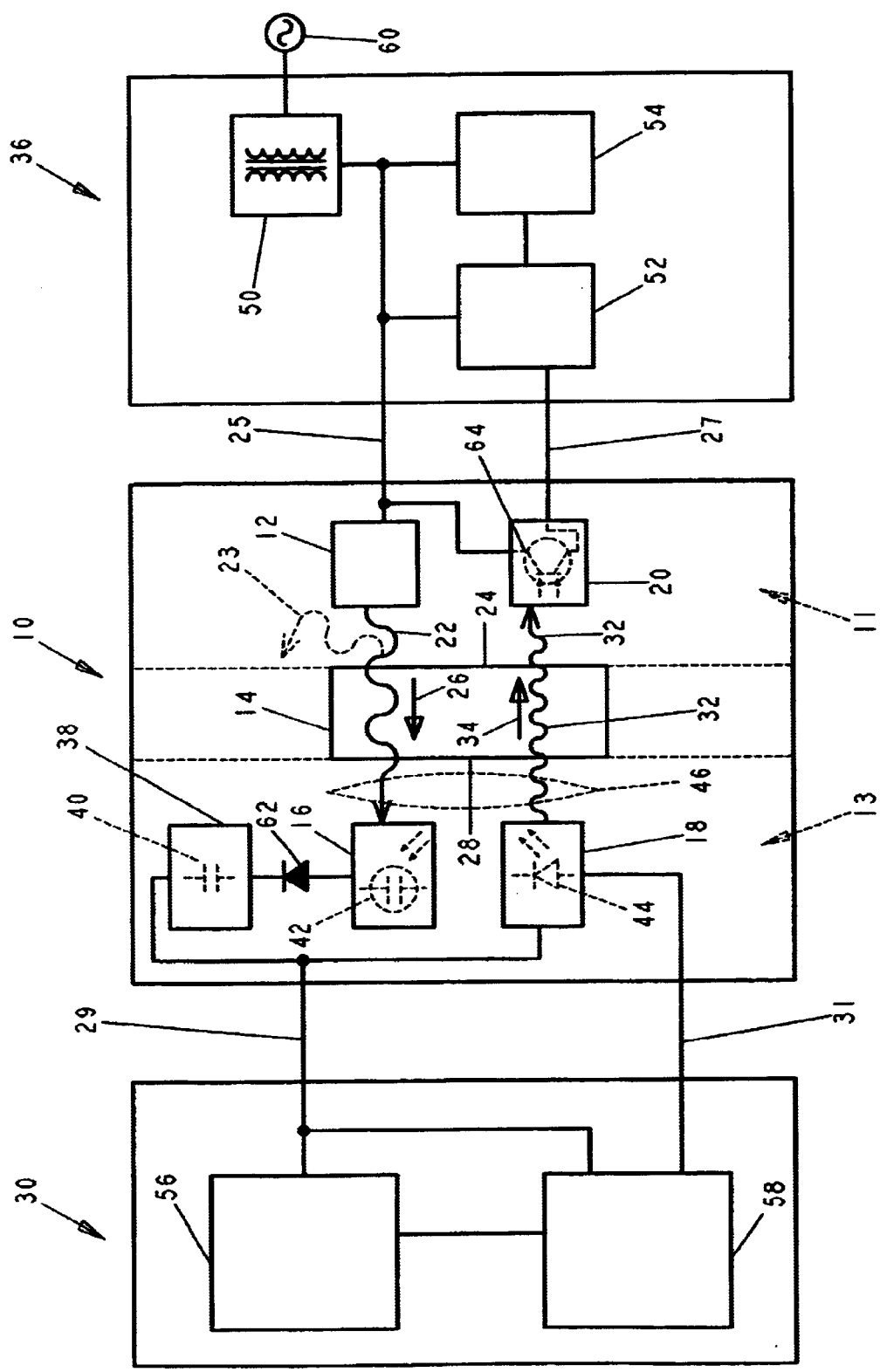
FIG. 1 is a diagrammatic view of an optical isolation device according to the present invention optically coupling and electrically isolating a local source circuit depicted on the right of the drawing and a remote isolated circuit depicted on the left of the drawing showing a light source and a opto-electrical sensor of the device coupled electrically to local source circuit and optically by an optical channel to an opto-electrical detector and optical signal generator which are electrically coupled to the remote isolated circuit, high intensity light generated by light source impinges upon a first end of the optical channel and propagates along the channel exiting through a second end of the optical channel where it impinges upon the opto-electrical detector, power generated by opto-electrical detector is stored in a power storage device which supplies power to the remote isolated circuit and the optical signal generator, optical signal generator generates an optical signal that is transmitted along the optical channel so that the opto-electrical sensor adjacent to the first end is impinged upon by the optical signal.

An optical isolation device 10 according to the present invention is illustrated in FIG. 1. Optical isolation device 10 optically couples and electrically isolates various components on a local source circuit 36 from components on a remote isolated circuit 30. Optical isolation device 10 includes a light source 12, an opto-electrical sensor 20, an optical channel 14, an opto-electrical detector 16, and an optical signal generator 18 and may also include a lens 46 (shown in phantom lines in FIG. 1) and an electrical energy storage device 38 such as a capacitor 40 (shown in phantom lines in FIG. 1). Energy storage device 38 aids in providing a steady potential difference from which a user interface circuit 56 and other components of remote isolated circuit 30 may be powered. Other electrical storage devices 38 such as rechargeable batteries or power cells are also within the teaching of the invention. Energy storage device 38 is electrically coupled to opto-electrical detector 16 which in the illustrated embodiment is a photovoltaic cell 42.

Illustratively, local source circuit 36 includes a power source 50 for driving light source 12 and powering opto-electrical sensor 20 of optical isolation device 10, a controller 52 for receiving electrical signals generated by sensor 20 in response to optical signals 32 and generating control signals for actuators, and actuators 54. Remote isolated circuit 30 includes a user interface 56 and an electrical signal generator 58 powered by electricity produced by the opto-electrical detector 16 of optical isolation device 10. Electrical signal generator 58 produces electrical signals triggered by user interface 56 and is coupled to the optical signal generator 18 of device 10 which converts the electrical signals to optical signals 32. In the illustrated embodiment, optical signal generator 18 includes light emitting diode ("LED") 44. However it should be understood that other sources for generating optical signals may be used within the teaching of the invention. Optical signals 32 are propagated along optical channel 14 between remote isolated circuit 30 and local source circuit 36.

Illustratively, light source 12 and opto-electrical sensor 20 are on a source side 11 of optical isolation device 10 which is optically coupled by optical channel 14 with isolated side 13 of optical isolation device 10. Illustratively, isolated side 13 of optical isolation device 10 includes lens 46, opto-electrical detector 16, optical signal generator 18, and storage device 38.

Optical channel 14, such as a fiber optic filament 15, includes a first end 24 communicating with light source 12 and opto-electrical sensor 20 and a second end 28 communicating with opto-electrical detector 16 and optical signal generator 18. Light source 12 is electrically coupled to power supply 50. Source side 11 and isolated side 13 of device 10 are isolated electrically from one another by optical channel 14, yet may transmit optical signals 32 and light 22 between one another. Optical isolation device 10 is electrically coupled at source side 11 by power line 25 and signal line 27 to a local source circuit 36 (See FIG. 1) including power supply 50, control circuitry 52, and actuators 54. Likewise, optical isolation device 10 is electrically coupled at isolated side 13 by power line 29 and signal line 31 to remote isolated circuit 30 including power consuming devices such as user interface 56 and electrical signal generator 58.

Light 22 generated by light source 12 impinges upon first end 24 of optical channel 14 and is transmitted in a first direction 26 along optical channel 14 exiting through second end 28 of optical channel 14 to impinge upon opto-electrical detector 16. While the term light may be strictly defined as visible light having a wavelength in the visible spectrum (i.e. ~0.4 82 m—~0.76 μm), as used in this application such light will be referred to as visible light and the term light and similar terms and prefixes such as optical, opto- and photo- shall be deemed to include electromagnetic radiation in the near ultraviolet, visible, and near infrared spectrums. Opto-electrical detector 16 produces electricity when impinged upon by light 22.

As shown, for example, in FIG. 1, opto-electrical detector 16 is electrically coupled by power line 29 to remote isolated circuit 30 which is powered by the electricity generated by opto-electrical detector 16 in response to being impinged upon by light 22. Remote isolated circuit 30 is also electrically coupled by signal line 31 to optical signal generator 18 which generates optical signals 32 in response to electrical signals received from remote isolated circuit 30.

Optical signals 32 impinge upon second end 28 of optical channel 14 and are transmitted in a second direction 34 along optical channel 14 exiting through first end 24 to impinge upon opto-electrical sensor 20. Opto-electrical sensor 20 produces electrical signals in response to being impinged upon by optical signals 32. Illustratively, opto-electrical sensor 20 is electrically coupled by signal line 27 to local source circuit 36 which performs tasks in response to electrical signals generated by opto-electrical sensor 20. Thus, remote isolated circuit 30 is completely electrically isolated from, but in communication with and powered by, local source circuit 36.

Illustratively, opto-electrical detector 16 is a photovoltaic cell 42. Photovoltaic cell 42 self-generates electricity only when being impinged upon by light 22. The potential difference or output voltage generated by photovoltaic cell 42 is a function of the intensity of light 22 impinging upon the junction of photovoltaic cell 42. The use of photovoltaic cell 42 as opto-electrical detector 16 eliminates the need for inclusion of another power source in remote isolated circuit 30 or on isolated side 13 of isolation device 10 because it self-generates electricity. Other self-generating opto-electrical sensors 16 or photonic devices that generate electricity when impinged upon by light 22 are within the teaching of the invention. Also, while illustrated as a single photocell 42, it is within the teaching of the disclosure for opto-electrical detector 16 to include an array of photovoltaic cells and/or other self-generating opto-electrical detectors 16 or photonic devices.

Each embodiment of optical isolation device disclosed herein includes substantially all of the elements described above. In general each functions by converting electrical energy supplied by a power supply 50 in the local source circuit 36 to light 22 which is transmitted to the isolated side 13 where light 22 is transformed to electrical power for powering components of isolated side 13 and remote isolated circuit 30. Remote isolated circuit 30 generates electrical signals which are converted to optical signals 32 which are transmitted to the source side 11 where they are converted to electrical signals which are used to control components of the local source circuit 36.

It will be understood that light 22 impinging upon first end 24 of optical channel 14 will be partially reflected forming reflected light 23 and partially transmitted as transmitted light 22. Reflected light 23 may impinge upon opto-electrical sensor 20 swamping out optical signals 32 or interfering with optical signals 32. The various embodiments disclosed herein differ in the means by which they prevent reflected light 23 from swamping out or interfering with optical signals 32.

Figure 2:
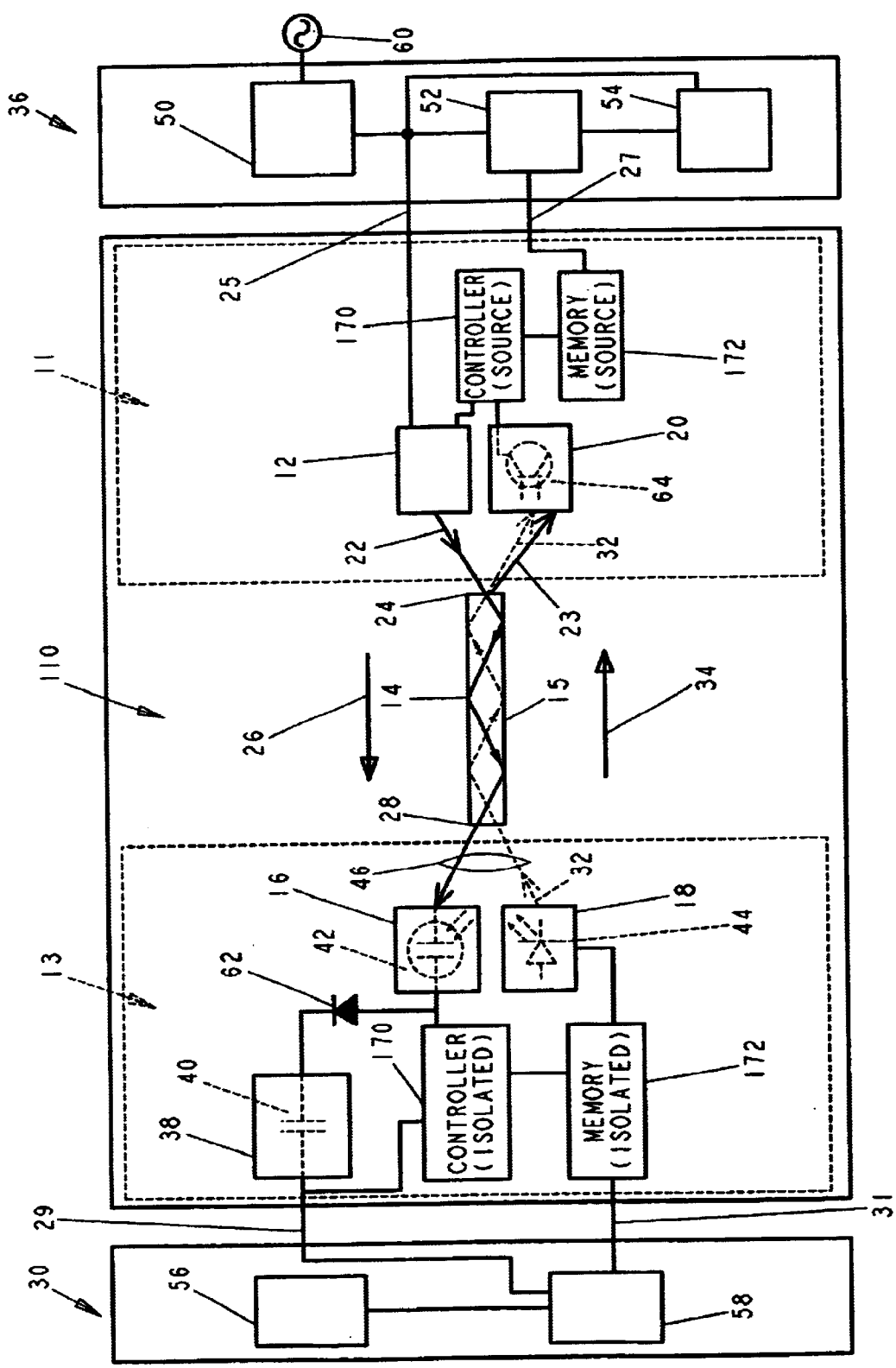
FIG. 2 is a block diagram of a half-duplex, single channel fiber optic isolation device in accordance with the present invention showing a local source circuit optically coupled to and electrically isolated from a remote isolated circuit by a single fiber optic filament and also showing controller and memory elements on a source side and an isolated side of the device to facilitate half-duplex operation.
Figure 5:
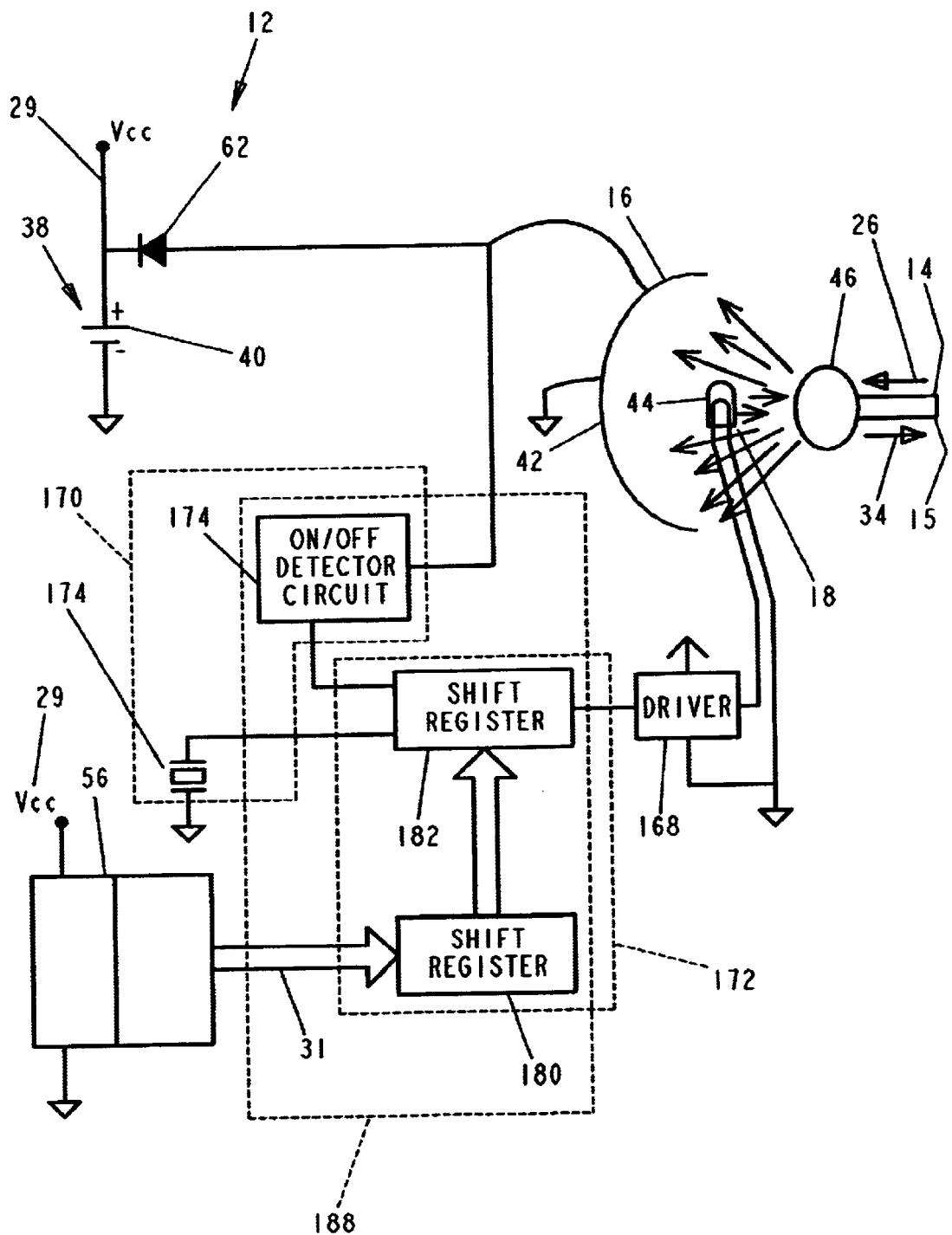
FIG. 5 is a diagrammatic view of the optical channel, opto-electrical detector, isolated side memory and controller components, and optical signal generator of the half-duplex, single channel fiber optic isolation device of FIG. 4 and the remote isolated circuit showing a photovoltaic cell serving as an opto-electrical detector for detecting high intensity light and generating power to be stored in the storage device for powering the components on the remote isolated circuit and optical signal generator, a user interface for providing input to devices on the local source circuit, a clock, an on/off detector for determining when high intensity light is and is not being received, a low intensity light source such as an LED acting as optical signal generator for transmitting optical signals indicating the state of the user interface based on state information stored in state registers and shift registers and converted to electrical signals by an LED driver.
Figure 6:
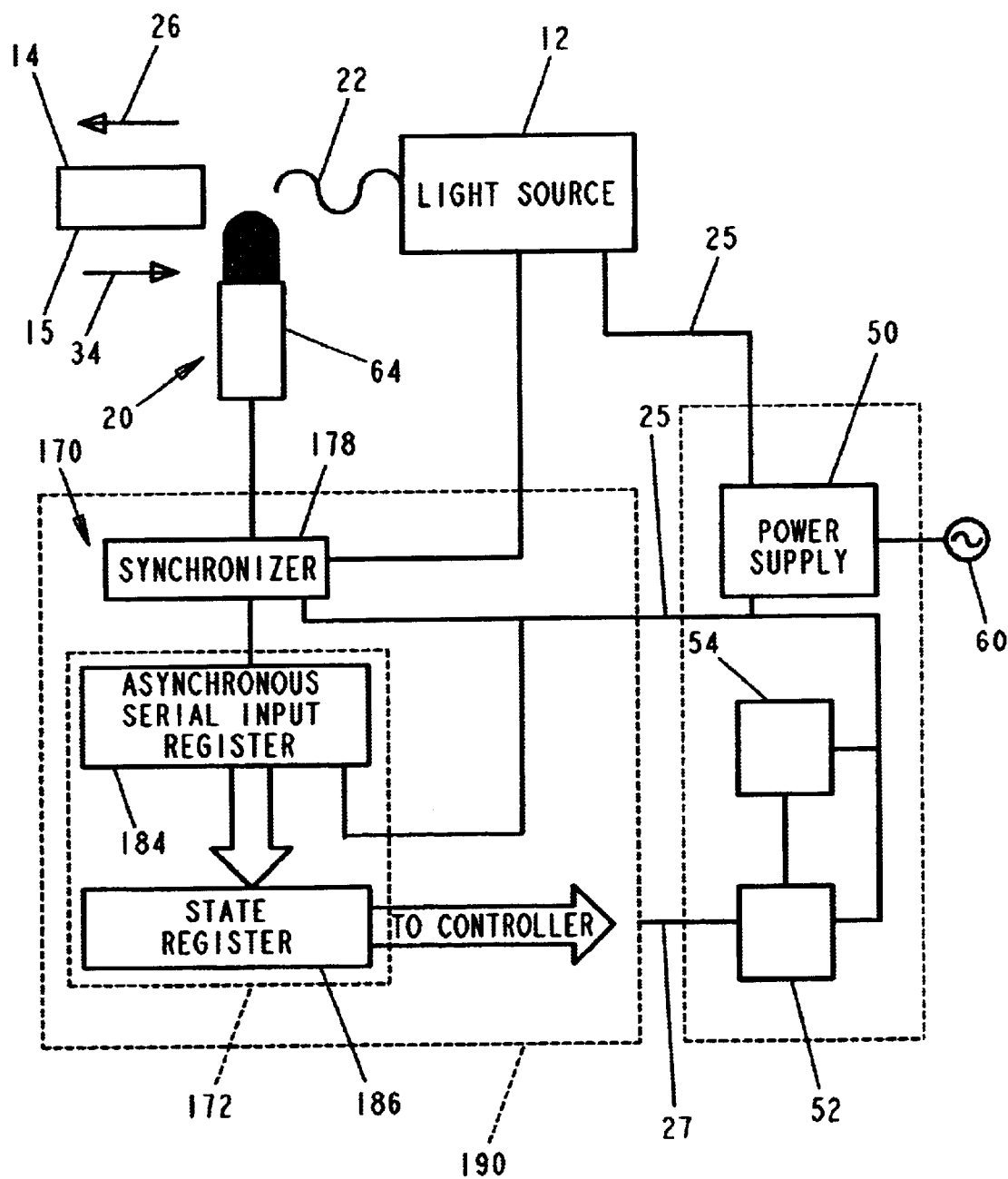
FIG. 6 is a diagrammatic view of the optical channel, high intensity light source, source side memory and controller components, and opto-electrical sensor of the half-duplex, single channel fiber optic isolation device and the local source circuit of FIG. 4 showing a power supply powering the various components of the source side of the device and the local source circuit and also showing the opto-electrical sensor receiving the optical signals from the remote isolated circuit and converting them to electrical signals, a synchronizer for controlling the duty cycle of the high intensity light source and the opto-electrical sensor, a serial input register for storing the electrical signals, and a state register for communicating the stored electrical signals to a controller controlling devices on the local source circuit; and, FIG. 7 is a block diagram of a full-duplex, fiber optic isolation device in accordance with the present invention showing a light source generating light at a first wavelength which light is optically transmitted along a fiber optic filament to be refracted by a lens to impinge upon an opto-electrical detector sensitive in a bandwidth including the first frequency, and an optical signal generator producing optical signals centered about a second frequency which optical signals are refracted by the lens and optically transmitted along the fiber optic filament to impinge upon an opto-electrical sensor sensitive in a bandwidth including the second frequency but not the first frequency.

Referring to FIGS. 2, 5 and 6, a half-duplex, single channel fiber optic isolation device 110 includes an electrical storage device 38 shown as a capacitor 40. Energy storage device 38 is electrically coupled to opto-electrical detector 16 which in the illustrated embodiment is a photovoltaic cell 42. Half-duplex, single channel fiber optic isolation device 110 requires only a single optical transmission path, shown as fiber optic filament 15. Remote isolated circuit 30 is electrically isolated from the local source circuit 36. In a medical device application, remote isolated circuit 30 would be connected or enable direct exposure to a patient or caregiver. Local source circuit 36, isolated from patient and caregiver, is in direct electrical contact with high voltage power circuits such as motor drivers and mains potentials 60. This configuration allows for communications between remote isolated circuit 30 and local source circuit 36 in one direction 26 or 34 at a time, i.e. half-duplex operation.

As previously mentioned, energy storage device 38 aids in providing a steady potential difference from which remote isolated circuit 30 and components of isolated side 13 of an optical isolation device 10 may be powered. Storage device 38 is charged by current flowing from photovoltaic cell when light 22 passes through lens 46 and optical channel 14 from light source 12. Illustratively, a diode 62 is associated with the storage device 38 to ensure that current flows only in one direction. Thus by including electrical storage device 38 in half-duplex, single channel fiber optic isolation device 10, the need for constant illumination of opto-electrical sensor 16 at a constant intensity is reduced. In fact, inclusion of electrical storage device 38 permits light source 12 to be intermittently turned off so that light source 12 can have a defined duty cycle. The duty cycle of light source 12 includes an on-cycle and an off cycle.

One advantage of being able to turn off light source 12 intermittently is that during the off cycle of the light source 12, optical signals 32 from optical signal generator 18 may be transmitted along a single fiber optic filament 15. In order to generate sufficient electrical power to drive the remote isolated circuit 30, it is desirable that light source 12 be a high intensity light source. In the illustrated embodiment light source 12 is a semiconductor laser 48 but may be some other type of laser or high intensity light source such as a flash lamp, strobe lamp, incandescent lamp or the like. As with any light impinging upon the boundary between two media having differing refractive indices, the high intensity light 22 impinging upon first end 24 of fiber optic filament 15 is partially refracted and partially reflected. The refracted light 22 enters fiber optic filament 15 at an angle inducing total internal reflection of the refracted light 22 at the cladding of fiber optic filament 15. The reflected light 23 may impinge upon opto-electrical detector 20.

To achieve complete electrical decoupling of remote isolated circuit 30 from local source circuit 36, it is desirable to generate optical signals 32 using little electrical power. Thus the intensity of optical signals 32 generated by optical signal generator is often very small compared to the intensity of light 22 generated by light source 12. Therefore, it is likely that the intensity of reflected light 23 generated by light source 12 which is reflected from the first end 24 of fiber optic filament 15 may be substantially greater than the intensity of optical signals 32 generated by the optical signal generator 18 which impinge upon opto-electrical sensor 20. If both light source 12 and optical signal generator 18 produce light having a bandwidth centered around the same frequency, reflected light 23 impinging upon the opto-electrical detector 20 could easily swamp out optical signal 32 impinging upon detector 20. Also with reflected light 23 and optical signals 32 at the same frequency the possibility of destructive interference arises. To eliminate concerns about swamping out of or interference with optical signals 32 by reflected light 23 from light source 12, fiber optic isolation device 110 includes a controller 170 which creates a duty cycle for light source 12 and causes optical signals 32 to be generated by optical signal generator 18 and opto-electrical sensor 20 to be responsive to light impinging upon it only during the off cycle of light source 12. Also memory elements 172 are provided on source side and isolated side to store data for creating optical signals 32 or received from optical signals 32. Since optical signals 32 are generated only when light source 12 is off, there is no possibility of interference between reflected light 23 and optical signal 32, and reflected light 23 cannot swamp out optical signal 32.

Controller 170 includes an on/off detector 174 and a clock 176 on isolated side 13 of device 110 and a synchronizer 178 on source side 11 of device 110. Illustratively, memory elements 172 include a state register 180 and shift register 182 on isolated side 13 of device 110 and an asynchronous serial input register 184 and a state register 186 on source side 11 of device 110. On/off detector 174 is a high input impedance monitoring device that detects when high intensity light 22 is present at photovoltaic cell 42. When light source 12 is OFF so that no light 22 impinges on photovoltaic cell 42, an enabling signal is sent to shift register 182 as a signal for it to send the contents of the state register 180 to the driver 168 and optical signal generator 18. Shift register 182 is an asynchronous serial communications circuit similar to, but not necessarily limited to, the standard RS232 communications protocol circuits. State register 180 collects and makes available to shift register 182 the current state of user interface 56. User interface 56 can be switches indicating an open/closed condition, levers indicating directional states, digitized outputs of potentiometers, or digitized outputs of position sensing devices as well as other condition and state indicating devices. On/Off detector 174, shift register 182, and state register 180 can be created from discrete components (IC's) or be functions of software in a micro-controller 188 (shown in phantom lines in FIG. 5).

As shown in FIG. 6, source side 11 of device 110 includes a high intensity light source 12 focused on optical channel 14 which illustratively is fiber optic cable 15. Synchronizer 178 is used to periodically turn light source 12 off and on and to indicate to the asynchronous serial input register 184 that data may be coming in.

During the periods that high intensity light source 12 is off, remote isolated circuit 13 may send data via optical signals 32 at low intensity light levels in a serial protocol fashion. Opto-electrical detector 20 is a low intensity light receiver such as a photo-transistor 64 which will detect the incoming data stream carried by optical signals 32 and convert it to electrical impulses to be sent to the asynchronous serial input register 184. Once the serial data is received and converted to parallel data, the information is passed to state register 186 which makes the data available to other systems, such as controller 52 for actuators 54 in local source circuit 36, as needed. In the example mentioned earlier, the state data could be used by motor driver circuits for moving the platform surfaces of a hospital bed. Optionally, synchronizer 178, asynchronous serial input register 184, and state register 186 could be functionally provided by software and a micro-controller 190 (shown in phantom lines in FIG. 6).

Figure 3:
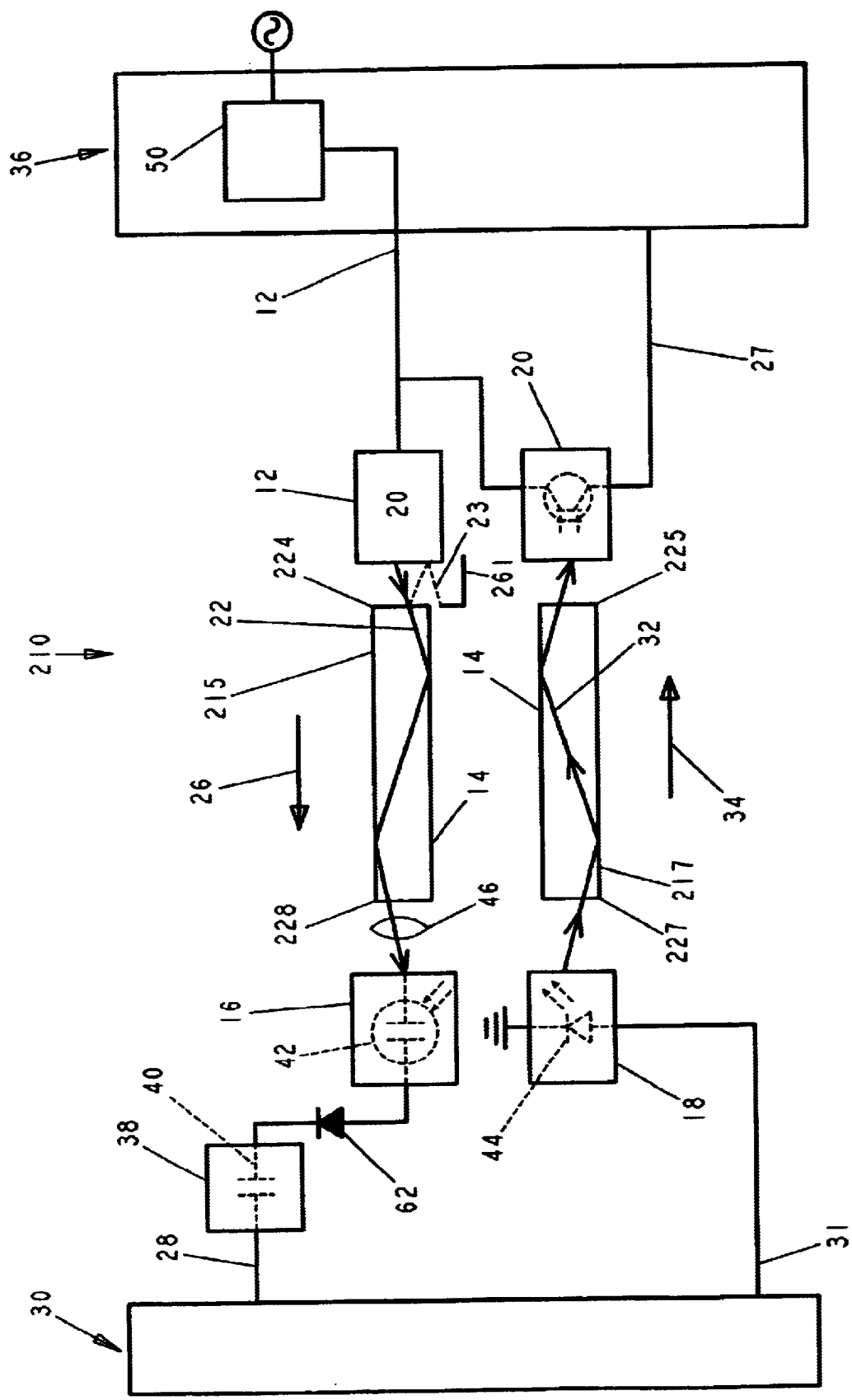
FIG. 3 is a block diagram of a full-duplex, dual channel fiber optic isolation device in accordance with the present invention showing a local source circuit optically coupled to and electrically isolated from a remote isolated circuit by a first fiber optic optical channel through which high intensity light is transmitted from a light source powered by a local source circuit to power remote isolated circuit and a second fiber optic optical channel through which low intensity light signals are transmitted responsive to electrical signals generated by the remote isolated circuit to the local source circuit.

Referring to FIG. 3, there is shown a full-duplex, dual channel fiber optic isolation device 210. Full-duplex, dual channel fiber optic isolation device 210 includes a light source 12, a power fiber optic filament 215 having a first end 224 and a second end 228, a dispersion lens 46 adjacent the second end 228, an opto-electrical detector 16, an optical signal generator 18, a signal fiber optic filament 217 having a first end 225 and a second end 227, an opto-electrical sensor 20 adjacent first end 225 of signal fiber optic filament 217, and a shield 261 disposed between light source 12 and first end 224 of power fiber optic filament 215 and opto-electric detector 20. With the addition of a second optical channel, communications in both directions can occur simultaneously, i.e. full-duplex operation. This results in improved rates of state data transfer to the end user. Energy storage device 38 in isolated side 13 of device 210 is reduced to minimum capacity size since light source 12 is never in the OFF state. Also, circuitry required for synchronization of optical signal generator 18, opto-electrical sensor 20 and light source 12 is not required.

Light source 12 transmits high intensity light 22 which impinges upon first end 224 of power fiber optic filament 215. Some high intensity light 23 is reflected at first end 224 of power fiber optic filament 215 and some high intensity light 22 is refracted at first end 224 of power fiber optic filament 215. Shield 261 is positioned to prevent reflected high intensity light 23 from impinging upon opto-electrical sensor 20, thereby preventing reflected light 23 from swamping out or interfering with optical signals 32. Refracted high intensity light 22 enters power fiber optic filament 215 at an angle which will cause total internal reflection of the light 22 at the boundary of the optical filament 215 so that refracted light 22 is propagated along power fiber optic filament 215 in a first direction 26 between first end 224 and second end 228. Light 22 exiting second end 228 of power fiber optic filament 215 is refracted by lens 46 to impinge upon opto-electrical detector 16. Opto-electrical detector 16 converts light 22 to electrical power.

Power line 29 electrically couples opto-electrical detector 16 to remote isolated circuit 30 which is powered by the electricity generated by opto-electrical detector 16. Remote isolated circuit 30 generates an electrical signal containing information to be transmitted to local source circuit 36. Signal line 31 electrically couples remote isolated circuit 30 to optical signal generator 18 which generates optical signals 32 in response to electrical signals generated by remote isolated circuit 30. Illustratively optical signal generator 18 includes an LED 44. LED 44 is adjacent second end 227 of signal optic filament 217 so that the optical signals 32 generated impinge on second end 227 of signal fiber optic filament 217. Optical signals 32 propagate along signal fiber optic filament 217 exiting at first end 225 to impinge upon opto-electrical sensor 20.

Since high intensity light 22 and optical signals 32 are transmitted along different filaments 215, 217 and opto-electrical detector 220 is optically shielded from light source 12 and from high intensity light 23 reflecting from first end 224 of power fiber optic filament 215, there is no need to include a controller or memory elements to control the duty cycle of light 12 and optical signal generator 18 and store state data. It should also be noted that the illustrated embodiment of full-duplex, dual channel fiber optic isolation device 210 need not include an electrical storage device 38, because light source 12 can always remain on allowing light 22 to continually impinge upon opto-electrical detector 16 thereby providing an uninterrupted supply of power to remote isolated circuit 30. In the illustrated embodiment, full-duplex, dual channel fiber optic isolation device 210 is provided with electrical storage device 38 in order to provide a more stable power source for remote isolated circuit 30.

Figure 4:
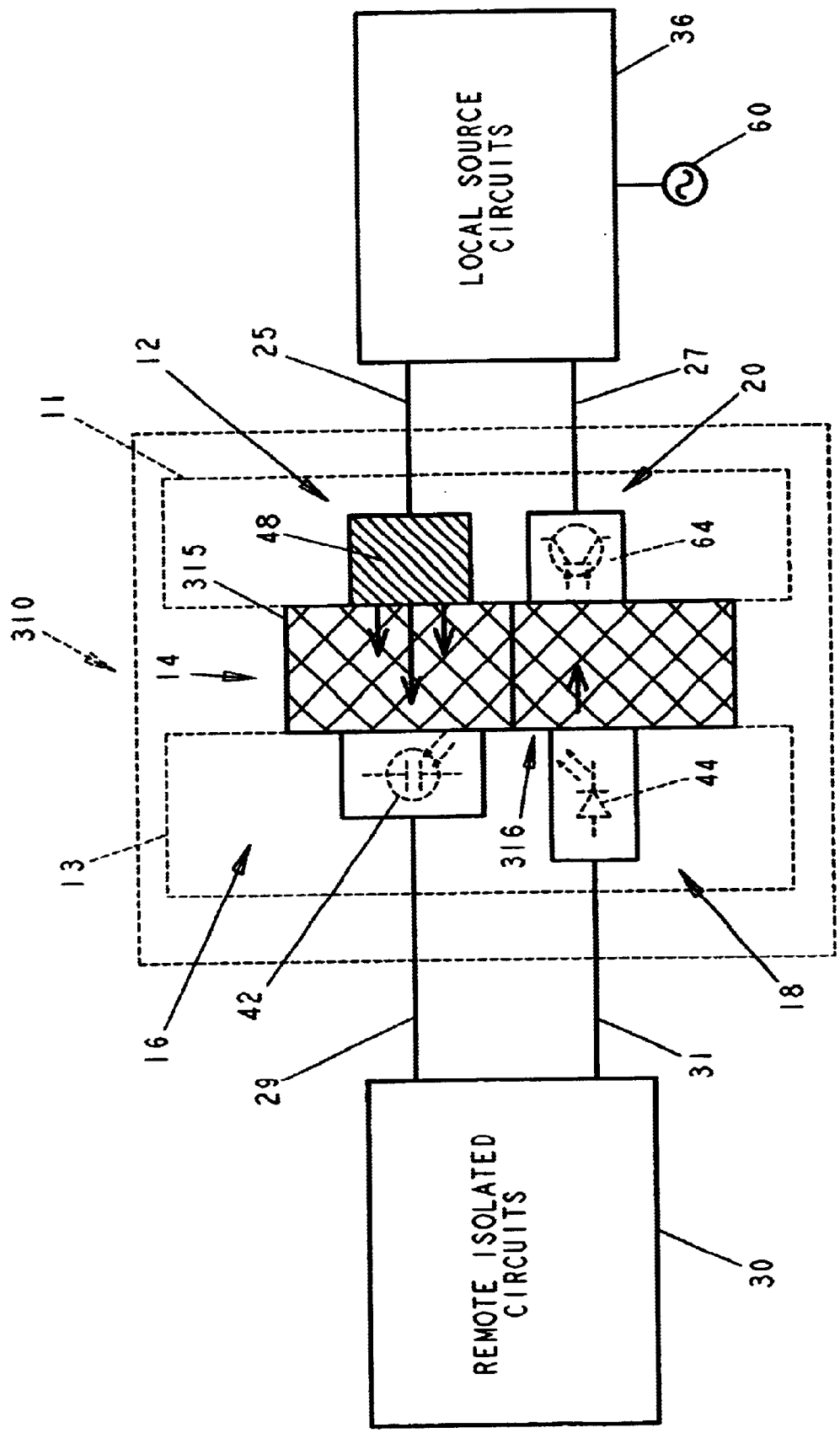
FIG. 4 is a block diagram of a full-duplex, single optical channel isolation device in accordance with the present invention showing a local source circuit optically coupled to and electrically isolated from a remote isolated circuit by a single optical channel, a high intensity light source on a source side of the device coupled to an opto-electrical detector on an isolated side of the device through the optical medium, and a low intensity light source on the isolated side of the device optically coupled to an opto-electrical sensor on the source side of the device through the optical medium.

Referring to FIG. 4, a full-duplex, single channel optical isolation device 310 is illustrated. Full-duplex, single channel optical isolation device 310 includes a light source 12 such as a laser 48, an optical channel 14, an opto-electrical detector 16 such as a flat photocell 342, an optical signal generator 18 such as an LED 44, and an opto-electrical sensor 20 such as a photo-transistor 64. Illustratively, optical channel 14 is a rigid (non-fiber) optical connection 315 between isolated side 13 and source side 11, and includes an optical isolation layer 316 to prevent interference between LED 44 and laser 48. Other materials such as glass, plastic, or gas can be used to provide an optical path 14 between isolated side 13 and source side 11. Optical isolation layer 316 may be an opaque or non-transparent material such as black plastic, or may be a layer with a high impedance mismatch relative to optical connection 315 to promote total reflection, or any other device that prevents penetration of light in the bandwidths of interest. In application, the entire device 310 can be located with the local source circuit 36, and remote isolated circuit 30 can be located elsewhere. Connection between remote isolated circuit 30, opto-electrical detector 16, and optical signal generator 18 can be made by conventional wiring techniques such as power line 29 and signal line 31. Electrical isolation is still maintained in that there is no electrically conductive connection between remote isolated circuit 30 and local source circuit 36. Flat photovoltaic cell 342 or an array of cells is used to convert light energy to electrical energy. The electrical energy may be stored prior to use in a storage device 38 (not shown in FIG. 4) and used later or may be directly used as described below.

In a hospital bed, where mains voltage 60 is used to power electric motors, pumps, or other actuators, local supply circuit 32 is located with device 310 near the high power components. Power and signal lines 29, 31 are routed away from the higher power circuitry to remote isolated circuit 30 containing user interface 56 (not shown in FIG. 4) containing control switches located for example, in the side rails or foot board. Patients and caregivers are protected from potentially hazardous energies. Energy levels in the remote isolated circuit 30 and power and signal lines 29, 31 are limited to safe current and voltage levels. Because of the optical isolation, there exists no surface which could provide a path for current flow between a patient or caregiver and the hazardous mains supply 60.

Figure 7:
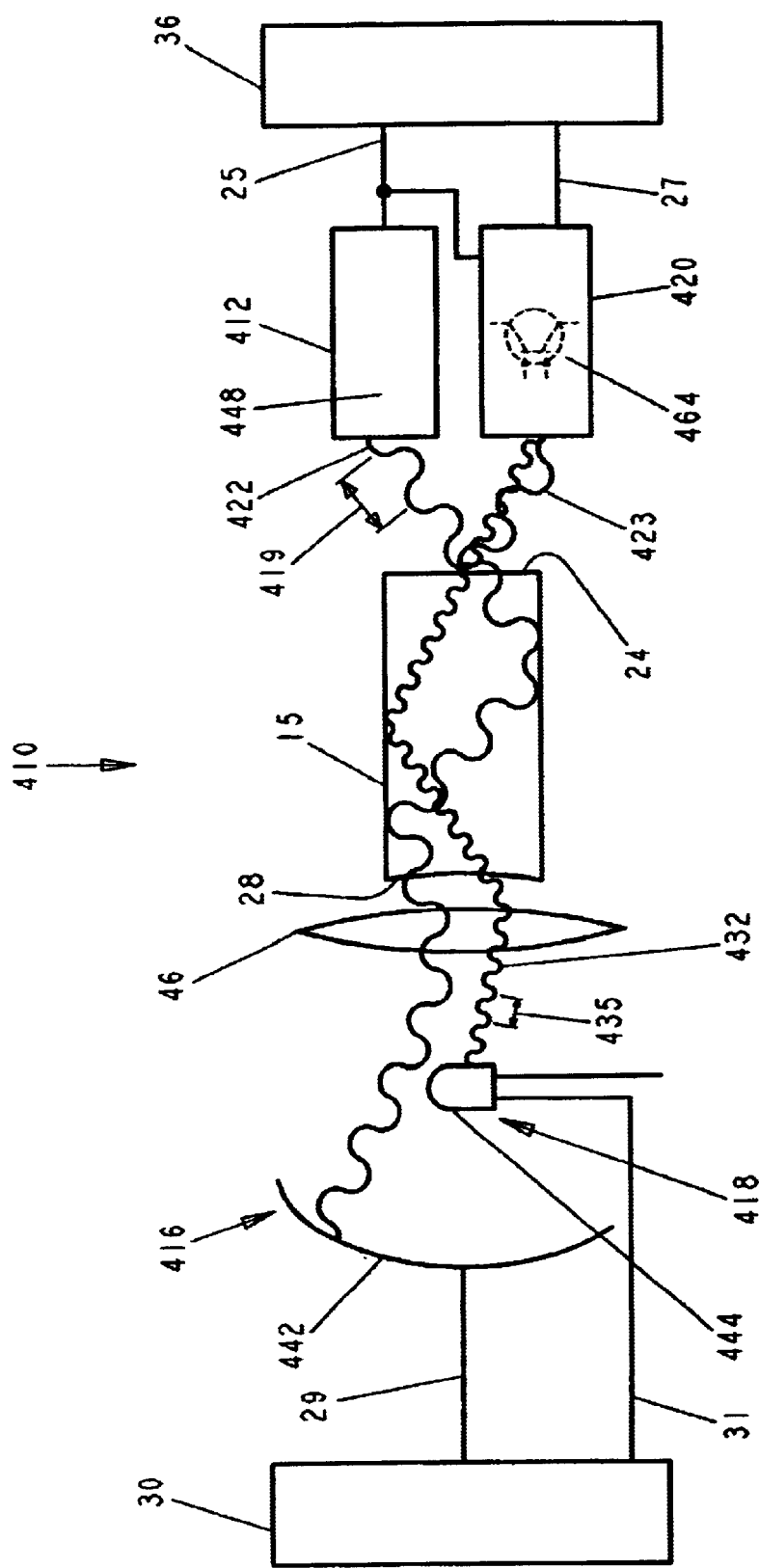

Referring to FIG. 7, a full-duplex, single channel optical fiber isolation device 410 is illustrated. Full-duplex, single channel optical fiber isolation device 410 includes a light source 412 generating light 422 having a bandwidth centered around a first frequency corresponding to a first wavelength 419, a fiber optic filament 15 having a first end 24 and a second end 28, a lens 46 adjacent second end 28 of fiber optic filament 15, an opto-electrical detector 416 in optical communication with the second end 28 of fiber optic filament 15, an optical signal generator 418 for generating optical signals 432 having a bandwidth centered about a second frequency corresponding to a second wavelength 435, and an optical sensor 420. Illustratively, light source 412 is a laser 48 which generates high intensity collimated monochromatic light 422 having the first wavelength 419. Laser light 422 impinges upon first end 24 of fiber optic filament 15 at an angle resulting in some of laser light 423 being reflected while other of laser light 422 is refracted at first end 24. The angle of incidence of laser light 422 on first end 24 is such that refracted laser light 422 is totally internally reflected by side wall of fiber optic filament 15 and propagated by fiber optic filament 15 between first end 24 and second end 28. At second end 28 laser light 422 is refracted by lens 46 so that laser light 422 impinges upon opto-electrical detector 416. Opto-electrical detector 416 is sensitive to light in a bandwidth including the first frequency corresponding to the first wavelength 419 and generates electricity when impinged upon by light within its sensitivity range.

Illustratively, opto-electrical detector 416 is a single curved photovoltaic cell 442. Laser light 422 entering fiber optic filament 415 at an angle of incidence to the longitudinal axis at first end 24 will exit from second end 28 in a conical annulus of light having the same angle as the angle of incidence. Lens 46 and the curvature of photovoltaic cell 442 cause the conical annulus of light to impinge uniformly upon photovoltaic cell 442. While, such uniformity may not be critical when a single photovoltaic cell 442 is used in the invention it is beneficial when an array of photovoltaic cells are used in accordance with the invention. While only FIG. 7 illustrates that the photovoltaic cell is curved, the photovoltaic cells in isolation devices 110 and 210 may also be curved within the teaching of this disclosure.

Optical signal generator 418 is illustratively an LED 444 producing light in a bandwidth centered about a second frequency corresponding to second wavelength 435. Optical signals 432 centered about second wavelength 435 are refracted by lens 46 and transmitted along fiber optic filament 15 between second end 28 and first end 24. Optical signals 432 exit first end 24 of fiber optic filament and impinge upon opto-electrical sensor 420.

Optical electrical sensor 420 is sensitive to light in a bandwidth including the second frequency corresponding to the second wavelength 435. Preferably opto-electrical sensor 420 has a sensitivity bandwidth which does not include the frequency corresponding to the first wavelength 419 of the reflected high intensity light 423, so that opto-electrical sensor 420 detects only the optical signals 432 generated by optical signal generator 418. Alternatively, a filter (not shown) which filters out light having the first wavelength and allows substantial amounts of light having the second wavelength to pass through could be placed over the junction of the photo-transistor 464 so that the response of opto-electrical detector 420 will be dictated by optical signals 432 and unaffected by reflected light 423.

Although the invention has been described in detail with reference to certain preferred embodiments, variations and modifications exist within the scope and spirit of the invention as described and defined in the following claims.

What is claimed is:

1. An optical isolation device comprising:
an optical channel having a first end and a second end;
a light source adjacent the first end for transmitting light through the optical channel;
a detector adjacent the second end for producing electrical power when impinged upon by the transmitted light;
a signal generator adjacent the second end powered by the electrical power from the detector, the signal generator transmitting optical signals through the optical channel in response to input from a remote isolated circuit at the second end, the input being generated by a user of the remote isolated circuit; and
a sensor adjacent the first end for producing electrical signals in response to the optical signals.

2. The device of claim 1 wherein the optical channel includes a fiber optic filament.

3. The device of claim 1 further comprising a lens adjacent the second end of the optical channel, the lens refracting both the optical signals and the light.

4. The device of claim 1 wherein the detector is an opto-electrical detector having a photovoltaic cell.

5. The device of claim 1 wherein the detector includes an array of photonic devices.

6. The device of claim 5 wherein the photonic devices are photovoltaic cells.

7. The device of claim 6 further comprising a lens adjacent the second end of the optical channel, the lens refracting both the optical signals and the transmitted light.

8. The device of claim 1 wherein the intensity of the light source and the sensitivity of the detector are sufficient to satisfy the power needs of the remote isolated circuit and the signal generator.

9. The device of claim 1 wherein the light source generates light in a bandwidth centered about a first frequency, the detector is sensitive in a bandwidth including the first frequency, the signal generator generating optical signals in a bandwidth centered about a second frequency, and the sensor being sensitive in a band width including the second frequency.

10. The device of claim 9 wherein the light source generates monochromatic light.

11. The device of claim 10 wherein the sensor is not sensitive to the monochromatic light.

12. The device of claim 9 wherein the sensor is not sensitive to light in the bandwidth centered about the first frequency.

13. The device of claim 9 wherein the light source is a laser.

14. The device of claim 13 wherein the laser is a semiconductor laser.

15. The device of claim 13 wherein the signal generator includes a light emitting diode.

16. The device of claim 9 wherein the light source has a narrow bandwidth.

17. An optical isolation device comprising:
   an optical channel having a first end and a second end;
   a light source adjacent the first end for transmitting light through the optical channel;
   a detector adjacent the second end for producing electrical power when impinged upon by the transmitted light;
   a signal generator adjacent the second end powered by the electrical power from the detector, the signal generator transmitting optical signals through the optical channel in response to input from a remote isolated circuit, the input being generated by a user of the remote isolated circuit;
   a sensor adjacent the first end for producing electrical signals in response to the optical signals; and
   a controller coupled to the light source and the sensor, the controller causing a task to be performed in response to receipt of the optical signals.

18. The device of claim 17 wherein the controller is further coupled to the signal generator, the controller inducing the light source to generate light in pulses having an on time and an off time and inducing the signal generator to generate optical signals during the off time of the light.

19. The device of claim 18 further comprising an electrical storage device electrically coupled to the detector.

20. A method of electrically isolating a remote circuit from a controller, the method comprising the steps of:
   transmitting a first light signal;
   converting the transmitted first light signal to electrical power only;
   powering the remote circuit with the electrical power;
   converting an electrical output signal from the remote circuit to a second light signal;
   transmitting the second light signal; and
   converting the transmitted second light signal to an electrical input signal for the controller to cause the controller to perform a task corresponding to the remote circuit electrical output signal;
   wherein the first and second light signals are optically coupled over a signal optical channel.

21. The method of claim 20, wherein power is generated by the first light signal impinging a photovoltaic cell.

22. The method of claim 20, further comprising the step of communicating the first light signal and the second light signal in a half-duplex mode.

23. The method of claim 22, wherein the step of communicating the first and second light signals in half-duplex mode comprises the steps of:
   communicating the first light signal according to a duty cycle having an on state and an off state; and
   communicating the second light signal during the off state of the duty cycle.

24. The method of claim 20, further comprising the step of communicating the first light signal and second light signal in full-duplex mode.

25. The method of claim 24, wherein the step of communicating the first and second light signals in full-duplex mode comprises the steps of:
   selecting a first frequency for the first light source;
   selecting a second frequency for the second light source, the second frequency being different from the first frequency;
   providing a photovoltaic cell responsive to the first frequency; and
   providing an opto-electrical sensor responsive to the second frequency.

26. The method of claim 20, wherein the first light signal is transmitted over a first optical channel and the second light signal is transmitted over a second optical channel.

27. The method of claim 26, wherein the first and second light signals are transmitted in a full-duplex mode.

28. The method of claim 27, further comprising the step of optically shielding the first and second optical channels to inhibit optical communication between the first and second optical channels.

29. An optical isolation device for isolating a user of a remote circuit for controlling equipment in a point of care environment from a circuit for powering the equipment, the device comprising:
   an optical channel;
   a light source for transmitting light in a first direction through the channel;
   a detector for producing power in response to the transmitted light;
   a signal generator powered by the power from the detector and electrically coupled to the remote circuit, the signal generator transmitting optical signals in a second direction through the channel in response to user-generated input signals from the remote circuit; and
   a sensor for producing electrical signals for controlling the equipment in response to the transmitted optical signals.

30. An optically isolated control system, including:
   a remote circuit for providing an input signal;
   source circuit including a power source, a controller, and an actuator controlled by the controller;
   an isolation device for optically isolating the remote circuit from the source circuit, the isolation device including
      an optical channel,
      a light source powered by the power source for transmitting light through the channel,
      a detector for converting the transmitted light to electrical power for powering the remote circuit,
      an optical signal generator, powered by the electrical power, for converting the input signal from the remote circuit to an optical signal, the optical signal generator transmitting the optical signal through the channel, and
      a sensor for converting the transmitted optical signal to an electrical signal;
   wherein the source circuit controller responds to the electrical signal by causing the actuator to perform a task corresponding to the input signal from the remote circuit.

* * * * *